(12) United States Patent
White

(10) Patent No.: US 9,436,942 B2
(45) Date of Patent: *Sep. 6, 2016

(54) FLEXIBLE MOBILE GIFT CARDS

(71) Applicant: AT&T Mobility II LLC, Atlanta, GA (US)

(72) Inventor: Spencer Neil White, Norcross, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 62 days.

This patent is subject to a terminal disclaimer.

(21) Appl. No.: 13/887,570

(22) Filed: May 6, 2013

(65) Prior Publication Data
US 2013/0246209 A1 Sep. 19, 2013

Related U.S. Application Data

(63) Continuation of application No. 12/615,769, filed on Nov. 10, 2009, now Pat. No. 8,438,073.

(60) Provisional application No. 61/219,530, filed on Jun. 23, 2009.

(51) Int. Cl.
*G06Q 20/12* (2012.01)
*G06Q 30/00* (2012.01)
*G06Q 30/08* (2012.01)
*G06Q 20/34* (2012.01)
*G06Q 20/10* (2012.01)
(Continued)

(52) U.S. Cl.
CPC .......... *G06Q 20/349* (2013.01); *G06Q 20/105* (2013.01); *G06Q 30/02* (2013.01); *G06Q 30/0601* (2013.01); *G06Q 20/322* (2013.01); *G06Q 30/0611* (2013.01)

(58) Field of Classification Search
CPC .......................................... G06Q 30/06–30/08
USPC ...................................... 705/26.1, 26.3, 26.4
See application file for complete search history.

(56) References Cited

U.S. PATENT DOCUMENTS 6,370,514 B1 4/2002 Messner
6,594,644 B1 7/2003 Van Dusen
(Continued)

OTHER PUBLICATIONS

Dulany, Emmett, Factors contributing to the final selling price of auctioned Home Depot gift cards on eBay, May 2009, Anderson University, whole document.
(Continued)

*Primary Examiner* — Jason Dunham
*Assistant Examiner* — Ming Shui
(74) *Attorney, Agent, or Firm* — Hartman & Citrin LLC

(57) ABSTRACT

Devices, systems and methods are disclosed which relate to allowing a recipient of a closed-loop gift card to select one of a number of merchants toward which to apply the value. A consumer buys a variable gift card from a service provider for a set amount, pays the service provider that amount, and the service provider holds that amount in escrow. The consumer sends the gift card to a recipient with a predetermined merchant. The recipient receives the gift card and decides to switch the gift card from the predetermined merchant to a desired merchant. The recipient requests the service provider to change the merchant, and the service provider delivers the amount from escrow to the desired merchant. If the recipient does desire to use the predetermined merchant, the recipient contacts the service provider for activation and the service provider transfers the amount to the predetermined merchant.

14 Claims, 7 Drawing Sheets

(51) Int. Cl.
  *G06Q 30/02* (2012.01)
  *G06Q 20/32* (2012.01)
  *G06Q 30/06* (2012.01)

(56) References Cited

U.S. PATENT DOCUMENTS

| | | | |
|---|---|---|---|
| 7,502,749 B2 | 3/2009 | Ganesan | |
| 8,046,266 B1* | 10/2011 | Geller | G06Q 30/02 705/14.1 |
| 2002/0032605 A1 | 3/2002 | Lee | |
| 2003/0018553 A1 | 1/2003 | Lindquist | |
| 2005/0228717 A1* | 10/2005 | Gusler | G06Q 10/02 705/14.34 |
| 2006/0289636 A1* | 12/2006 | Hoblit | 235/383 |
| 2008/0052164 A1* | 2/2008 | Abifaker | G06Q 20/10 705/14.27 |
| 2008/0071634 A1* | 3/2008 | Rampell et al. | 705/26 |
| 2008/0099551 A1 | 5/2008 | Harper | |
| 2008/0162299 A1 | 7/2008 | Gusler et al. | |
| 2008/0301005 A1 | 12/2008 | Neida | |
| 2009/0055296 A1 | 2/2009 | Nelsen | |
| 2009/0171773 A1 | 7/2009 | Shastry | |
| 2009/0179074 A1 | 7/2009 | Hurst | |
| 2009/0210318 A1 | 8/2009 | Abifaker | |
| 2009/0234771 A1 | 9/2009 | Ledbetter et al. | |
| 2009/0307118 A1 | 12/2009 | Baumgartner, IV | |
| 2010/0030654 A1* | 2/2010 | Dinkin et al. | 705/26 |
| 2010/0057580 A1 | 3/2010 | Raghunathan | |
| 2010/0262544 A1* | 10/2010 | Levchin et al. | 705/44 |
| 2010/0318415 A1* | 12/2010 | Gottlieb | G06Q 20/105 705/14.17 |
| 2010/0332295 A1* | 12/2010 | Rochman | 705/14.1 |
| 2011/0307378 A1 | 12/2011 | Doran et al. | |

OTHER PUBLICATIONS

U.S. Office Action dated Dec. 30, 2010 issued in U.S. Appl. No. 12/615,769.
U.S. Office Action dated Jun. 8, 2011 issued in U.S. Appl. No. 12/615,769.
U.S. Office Action dated Oct. 5, 2011 issued in U.S. Appl. No. 12/615,769.
U.S. Office Action dated Aug. 27, 2012 issued in U.S. Appl. No. 12/615,769.
U.S. Notice of Allowance dated Dec. 21, 2012 issued in U.S. Appl. No. 12/615,769.

* cited by examiner

FLEXIBLE MOBILE GIFT CARDS

CROSS-REFERENCE TO RELATED APPLICATIONS

This application is a continuation of and claims priority to U.S. patent application Ser. No. 12/615,769, entitled "Flexible Mobile Gift Cards," filed on Nov. 10, 2009, now U.S. Pat. No. 8,438,073, which is incorporated herein by reference in its entirety, and which claims priority to U.S. Provisional Patent Application No. 61/219,530, filed Jun. 23, 2009, which is hereby incorporated by reference in its entirety.

BACKGROUND

1. Field of the Invention

The present invention relates to gift cards. More specifically, the present invention relates to a gift card for a merchant that may be changed to a different merchant if desired by the recipient.

2. Background of the Invention

Often when a person feels the need to buy another a gift, the person does not know what kind of gifts the other wants or needs, or what others are giving. Gift cards allow a purchaser to give a gift recipient the option of what to buy. This allows for a more personal gift than giving, for instance, cash, but does not force the consumer to buy a specific gift.

There are generally two types of gift cards being marketed. One is referred to as an open loop and the other is referred to as a closed loop. A closed loop is the traditional kind of card. A consumer might go to a convenience store to buy a fixed denomination card for, for instance, BASS PRO SHOPS. The consumer goes into the store, picks up a $100 BASS PRO card, and goes to the register. The register will scan the information about that card into their systems and pass it through their terrestrial networks to a payment processor, which then essentially activates or issues that payment product. From that moment on, the card that the consumer has purchased is activated and is linked to the face value that was printed on the card. The gift card can be redeemed only at that particular merchant, which is, in this instance, BASS PRO SHOPS. The closed loop card has the majority of the gift card market that is out there today, with people buying merchant specific cards and sending them to someone else as a gift. The downside of a closed loop card is that the receiver might not be interested in anything from the chosen merchant. For instance, if a grandmother buys her grandson a BASS PRO gift card and sends it to him, but the grandson does not shop at BASS PRO and there is nothing there that interests him, then the grandson gets no value out of the gift card because he is probably not going to go shop there just to spend the money. His grandmother has wasted her money because she spent that money trying to get her grandson something that he wanted but he did not get such a gift. At the same time, the merchant, who is in business with that payment processor, is holding those funds and generating interest income. Often there are schemes that, over a period of time of card inactivity, the merchant will start charging a monthly maintenance fee that ultimately can result in all of those funds being forfeited back to that merchant. While some states have legislation affecting this, it is still a problem.

The other concept is an open loop card. For this type of gift card, a consumer buys, for instance, a $100 VISA card. That gift card can be sent just like any other gift card and the recipient can use it at any merchant that accepts VISA payments. However, this type of gift card is fairly impersonal as it is very similar to giving cash. Furthermore, consumers who wish to somewhat limit the options of the recipient cannot really do so with this type of card. For instance, a parent may wish to give a gift card to their child who is a college student. However, the parent may not want their child to just buy beer with the gift card. An open loop card, such as a VISA gift card, can be used anywhere VISA cards are accepted and thus could be used for goods the parent does not want their child buying.

Traditional gift cards are generally referred to as not reloadable cards. Since they are not typically a reloadable account, a credit account, or a demand deposit account, they are exempt from the KYC or the Know Your Customer federal regulations. In many cases, a non-reloadable card can be upgraded to a reloadable account at any point in time, but the recipient or the owner of that card has to provide additional information to identify themselves. Information such as a social security number and address may be necessary. This is the same type of information that one would have to submit to open a bank account or apply for credit.

What is needed is a gift card that allows for more freedom to choose a merchant, but while not losing all personalization.

SUMMARY

The present invention provides an apparatus and methods for allowing a recipient of a closed-loop gift card to select one of a number of merchants toward which to apply the value. A consumer buys a variable gift card from a service provider for a set amount. The consumer pays the service provider that amount, but the service provider holds that amount in escrow. The consumer sends the gift card to a recipient with a predetermined merchant. The recipient receives the gift card and decides not to use the gift card for the predetermined merchant, but for a desired merchant. The recipient requests that the service provider change the merchant. The service provider requests a final confirmation before delivering the amount from escrow to the desired merchant, and the gift card is ready for use. If the recipient does desire to use the predetermined merchant, the recipient simply contacts the service provider for activation, where the service provider transfers the amount to the predetermined merchant.

Furthermore, the present invention gives the consumer control over switches and notifications upon use. The service provider offers restrictions to be placed upon the gift card, which are enforced at the request to switch to a different merchant. Some restrictions force the recipient to stay within the same type of merchant, i.e. only restaurants, only clothing stores, etc. The service provider also monitors the gift card usage and provides feedback upon its use. The consumer knows when the gift card was used, for how much, and the remaining balance. In exemplary embodiments, the merchants may make offers during the switching process to out-bargain their competitors. For instance, while the service provider allows the recipient to choose from any merchant for face value, some merchants may offer a gift card worth more than face value, for no extra charge. A restaurant may want to give a $60 gift card for the $50 the recipient would get with any other merchant.

In one exemplary embodiment, the present invention is a method of gift card sales. The method includes selling a variable gift card to a consumer, the variable gift card having an amount and being associated with a predetermined merchant, acknowledging a transfer of ownership of the variable gift card to a recipient, offering to switch the predetermined merchant of the variable gift card with a desired merchant, and transferring funds equal to the amount to the desired merchant. A merchant is not paid during the initial sale, but after an offer to switch the predetermined merchant is acted upon.

In another exemplary embodiment, the present invention is a system for gift card sales. The system includes a consumer mobile device, a gift card server in communication with the consumer mobile device, a gift card database in communication with the gift card server, a variable gift card logic on the server for switching the merchant of a variable gift card, a number of merchant servers in communication with the gift card server, and a recipient mobile device in communication with the gift card server. A gift card purchased with the consumer mobile device is stored in the gift card database, and the recipient mobile device requests the server to switch the merchant of the variable gift card.

In yet another embodiment, the present invention is a computer program stored on a computer-readable medium. The computer program includes a first code segment for selling a variable gift card to a consumer, the variable gift card having an amount and being associated with a predetermined merchant, a second code segment for acknowledging a transfer of ownership of the variable gift card to a recipient, a third code segment for offering to switch the predetermined merchant of the variable gift card with a desired merchant, and a fourth code segment for transferring funds equal to the amount to the desired merchant. A merchant is not paid during the initial sale, but after an offer to switch the predetermined merchant is acted upon.

DETAILED DESCRIPTION

Figure 1:
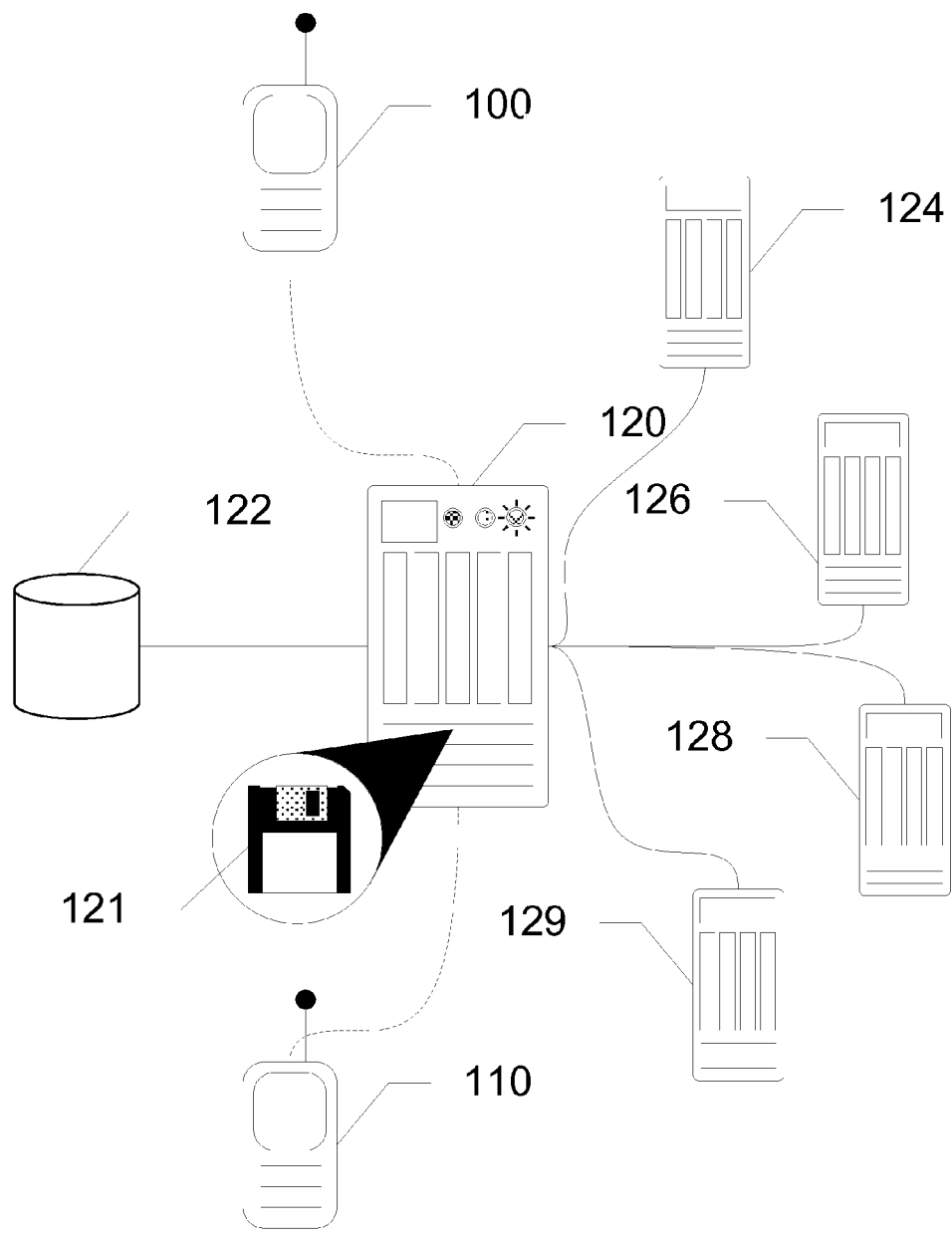
FIG. 1 shows a system of the present invention utilizing mobile devices, according to an exemplary embodiment of the present invention.

The present invention provides a system and methods for allowing a recipient of a closed-loop gift card to select one of a number of merchants toward which to apply the value. A consumer buys a variable gift card from a service provider for a set amount. The consumer pays the service provider that amount, but the service provider holds that amount in escrow. The consumer sends the gift card to a recipient with a predetermined merchant. The recipient receives the gift card and decides not to use the gift card for the predetermined merchant, but for a desired merchant. The recipient requests that the service provider change the merchant. The service provider requests a final confirmation before delivering the amount from escrow to the desired merchant, and the gift card is ready for use. If the recipient does desire to use the predetermined merchant, the recipient simply contacts the service provider for activation, where the service provider transfers the amount to the predetermined merchant.

Furthermore, the present invention gives the consumer control over switches and notifications upon use. The service provider offers restrictions to be placed upon the gift card, which are enforced at the request to switch to a different merchant. Some restrictions force the recipient to stay within the same type of merchant, i.e. only restaurants, only clothing stores, etc. The service provider also monitors the gift card usage and provides feedback upon its use. The consumer knows when the gift card was used, for how much, and the remaining balance. In exemplary embodiments, the merchants may make offers during the switching process to out-bargain their competitors. For instance, while the service provider allows the recipient to choose from any merchant for face value, some merchants may offer a gift card worth more than face value, for no extra charge. A restaurant may want to give a $60 gift card for the $50 the recipient would get with any other merchant.

A "mobile device," as used herein and throughout this disclosure, refers to any electronic device capable of communication with another electronic device. Examples of mobile devices include cellular telephones, personal digital assistants (PDAs), notebook computers, tablet computers, etc.

"Logic," as used herein and throughout this disclosure, refers to any information having the form of instruction signals and/or data that may be applied to affect the operation of a processor. Examples of processors are computer processors (processing units), microprocessors, digital signal processors, controllers and microcontrollers, etc. Logic may be formed from signals stored in a device memory. Software is one example of such logic. Examples of device memories that may include logic include RAM (random access memory), flash memories, ROMS (read-only memories), EPROMS (erasable programmable read-only memories), and EEPROMS (electrically erasable programmable read-only memories). Logic may also be provided by digital and/or analog hardware circuits, for example, hardware circuits comprising logical AND, OR, XOR, NAND, NOR, and other logical operations. Logic may be formed from combinations of software and hardware.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows a system of the present invention utilizing mobile devices, according to an exemplary embodiment of the present invention. In this embodiment, the system includes a gift card server 120 including a variable gift card logic 121, a database 122 in communication with the gift card server, a number of merchants 124, 126, 128, 129, including a predetermined merchant 124 and a desired merchant 126, the number of merchants 124, 126, 128, 129 in communication with gift card server 120, a consumer mobile device 100 in communication with gift card server 120, and a recipient mobile device 110 in communication with gift card server 120.

In this embodiment, a consumer buys a variable gift card for a recipient. The consumer chooses predetermined merchant 124, which is reflected on the variable gift card. The consumer also pays an amount for the variable gift card, which is reflected on the variable gift card. However, the amount paid is held in escrow. The consumer then elects to send the gift card to recipient mobile device 110. Gift card server 120 transfers the variable gift card to recipient mobile device 110. Recipient mobile device 110 receives the variable gift card along with an offer to switch predetermined merchant 124 for a desired merchant 126. The recipient uses recipient mobile device 110 to select desired merchant 126. Recipient mobile device 110 communicates with gift card server 120 to confirm the selection. Once confirmed, gift card server 120 transfers the amount from escrow to desired merchant 126.

The present invention is more applicable to a closed loop or a merchant specific card. As a mobile centric gift card, the gift card can be sent via a mobile device or any other type of interactive media. For instance, the gift card could be sent through e-mail or it could be presented through a web interface. According to the invention, the consumer makes a purchase from a service provider by selecting a merchant that they think would be appropriate for the receiver. Either the consumer or service provider then sends an electronic message either through the mobile device or the web to notify the recipient that the consumer sent them a gift card for the merchant with a certain denomination. Because the service provider is controlling the sale experience and the underlying platforms, activation of the gift card, or issuing it, is deferred until the recipient wishes to redeem it.

For example, a grandson receives the gift card from his grandmother for BASS PRO SHOPS and the gift card is received on his mobile device. The gift card can be sent as a Short Message Service (SMS) text message, MultiMedia Service (MMS) message, email, etc. The message may contain a multimedia greeting gift card with a link at the bottom. The link says, for example, "Not interested in Bass Pro? Click here to learn how to apply this to any other merchant that you like." When the grandson selects the link, he can search a list of any merchant that is in the service provider's catalog or that the service provider has a business relationship with. The grandson prefers BORDER'S BOOKS to BASS PRO SHOPS. According to the present invention, the grandson uses the link to switch from the previously selected BASS PRO SHOPS gift card to a BORDER'S BOOKS gift card. The grandson authorizes the service provider to issue or activate the gift card. The service provider then reaches out to the payment processor to finalize the issuance. The amount of money is applied to a BORDER'S gift card with an account number. The payment is made at this stage because the service provider holds these funds in an intermediary or escrow account until the recipient finalizes the choice of gift card. The service provider may charge a convenience fee to the consumer to allow for the ability to switch between merchants.

Figure 2:
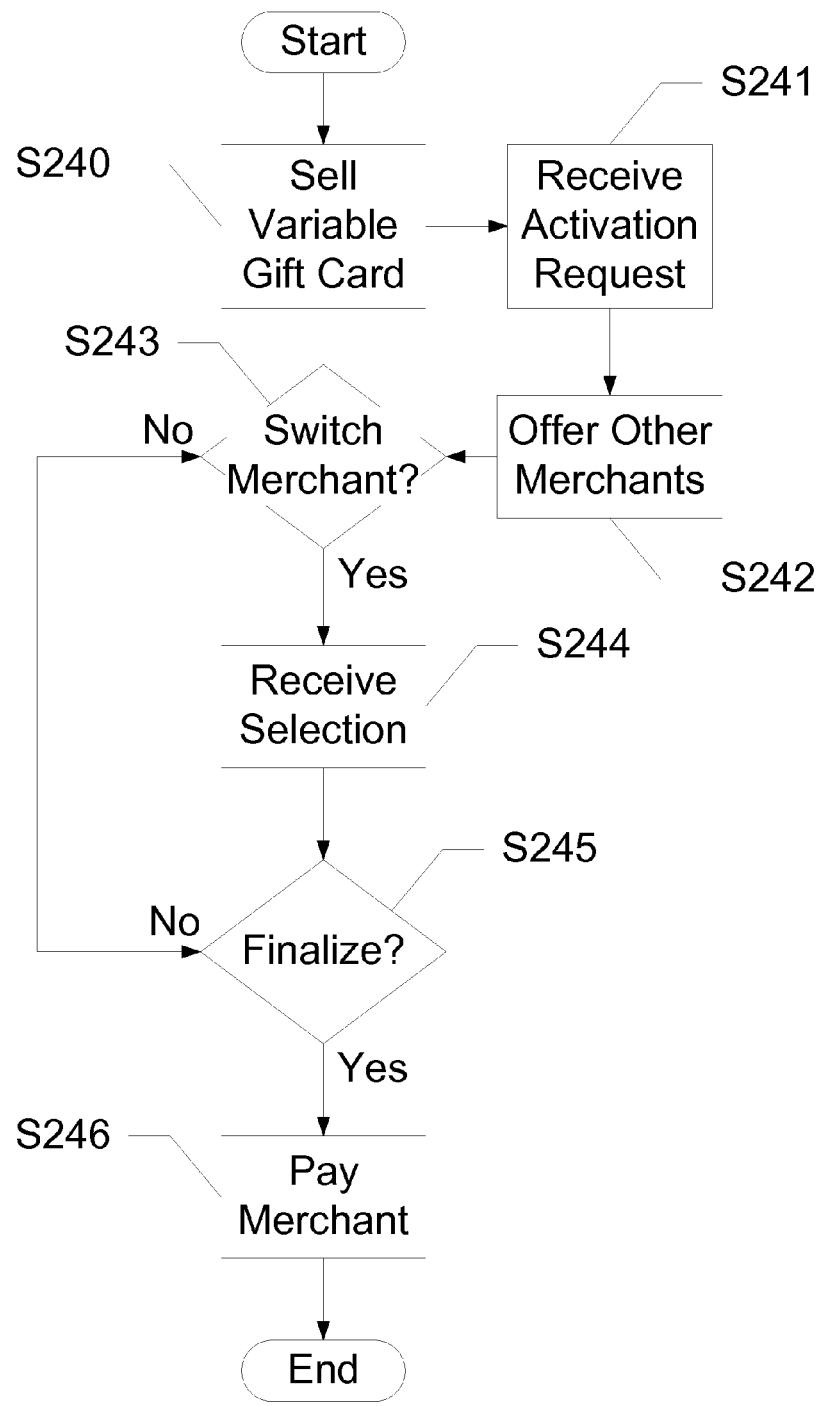
FIG. 2 shows a method of the present invention utilized by a service provider, according to an exemplary embodiment of the present invention.

FIG. 2 shows a method of the present invention utilized by a service provider, according to an exemplary embodiment of the present invention. In this embodiment, a consumer buys a variable gift card for a recipient. The variable gift card is sold to the consumer S240 and a gift card server sends a notification to the recipient mobile device. Once the recipient is notified, the recipient uses the recipient mobile device to activate the variable gift card. The gift card server receives an activation request S241 along with an offer to switch a predetermined merchant with one of a number of merchants S242. The gift card server queries the recipient whether or not to switch merchants S243. If the recipient chooses to switch merchants, then the recipient proceeds to select a desired merchant. Once the recipient selects the desired merchant, the gift card server receives the selection S244. The recipient is then asked to finalize the selection of the desired merchant S245. If the recipient chooses not to switch merchants, then finalization is asked immediately. If the recipient chooses to finalize the selection of the desired merchant, then the gift card server transfers the amount to the desired merchant S246. If the recipient chooses not to finalize, then the recipient is offered to switch merchants S243. If the recipient chooses not to switch merchants, and finalizes that decision, then the gift card server transfers the amount to the predetermined merchant.

In an exemplary embodiment of the present invention, when the recipient receives the message, the recipient is prompted to either download, or activate a preloaded mobile wallet to "accept" the gift. This may be incorporated in a mobile wallet service, such as that disclosed in U.S. patent application Ser. No. 11/727,493, filed Mar. 27, 2007, which is hereby incorporated by reference herein in its entirety. With mobile wallet services, technology is embedded into mobile phones that allow the user to pay for goods and services in a retail environment. Mobile wallets use, for instance, near field communications based off of RFID. Additionally, these mobile wallets can use scanning of barcodes to process transactions. Once the wallet is set up, the consumer can use NFC or other mobile payment services to redeem the card with the gift card server.

Figure 3:
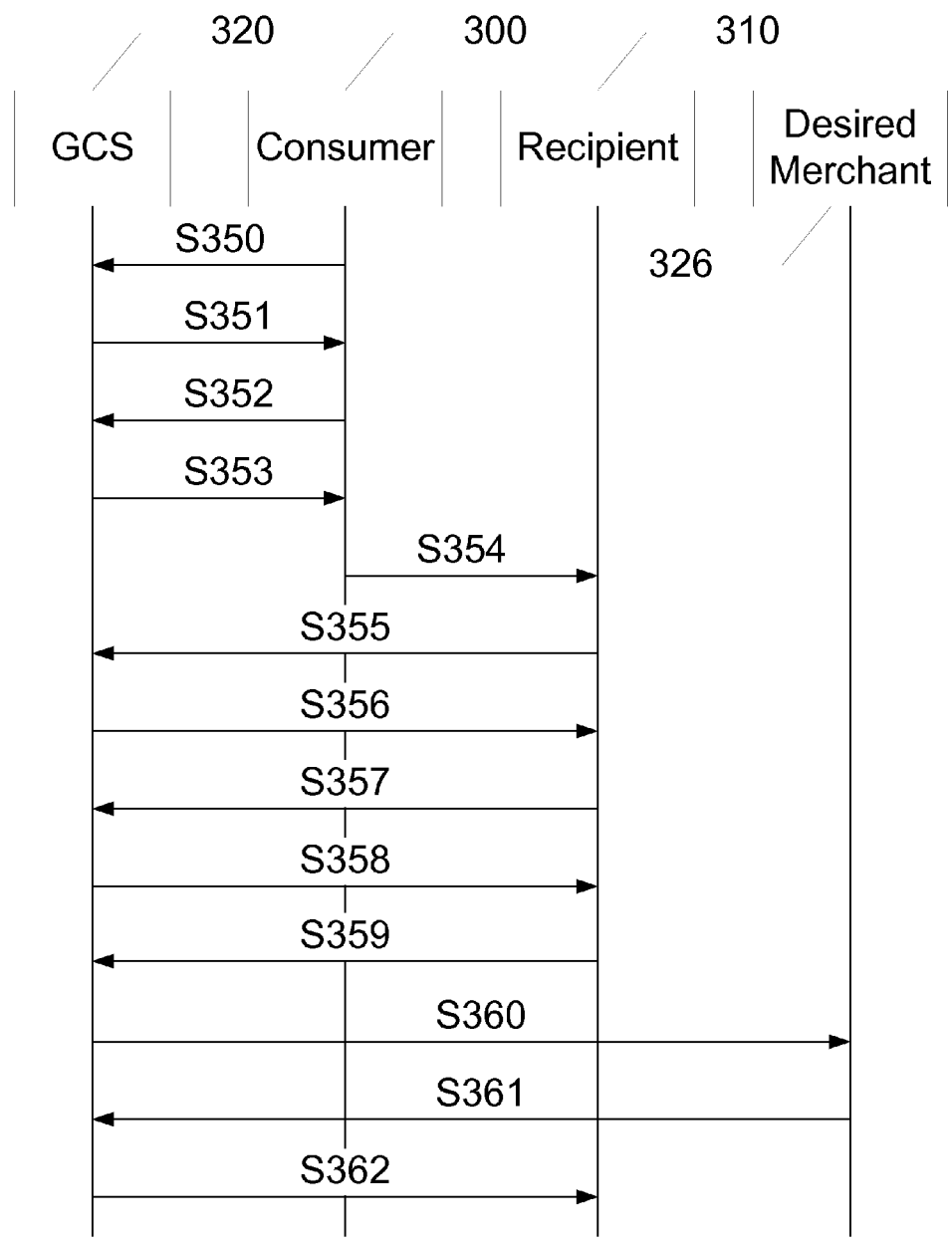
FIG. 3 shows an action diagram of a method of the present invention, according to an exemplary embodiment of the present invention.

FIG. 3 shows an action diagram of a method of the present invention, according to an exemplary embodiment of the present invention. In this embodiment, the actions are shown between a gift card server (GCS) 320, a consumer mobile device 300 in communication with gift card server 320, a recipient mobile device 310 in communication with gift card server 320 and consumer mobile device 300, and a desired merchant 326 in communication with gift card server 320.

Consumer mobile device 300 requests a gift card S350 from gift card server 320. Gift card server 320 then offers a variable gift card S351 to consumer mobile device 300. Consumer mobile device 300 accepts the offer by paying an amount for a predetermined merchant to purchase the variable gift card S352. Gift card server 320 sends the variable gift card S353 to consumer mobile device 300. Consumer mobile device 300 then forwards the variable gift card S354 to recipient mobile device 310. Once received, recipient mobile device 310 communicates with gift card server 320 to activate the variable gift card S355. Gift card server 320 then offers the recipient an option to switch merchants S356. Recipient mobile device 310 sends the selection of the desired merchant S357 to gift card server 320. Gift card server 320 then requests the recipient to confirm the desired merchant S358. Recipient mobile device 310 sends a final confirmation S359 to gift card server 320. Gift card server 320 then transfers the amount S360 to desired merchant 326, and the variable gift card is activated. Desired merchant 326 sends confirmation of the activation S361 to gift card server 320, which forwards the activation confirmation S362 to recipient mobile device 310.

Further embodiments of the present invention provide the consumer with feedback. According to the present invention, in addition to using the interactive mediums as a means for delivery, the interactive mediums can also be a back channel to send information back to the consumer to inform them whether the card has been activated or redeemed.

Figure 4:
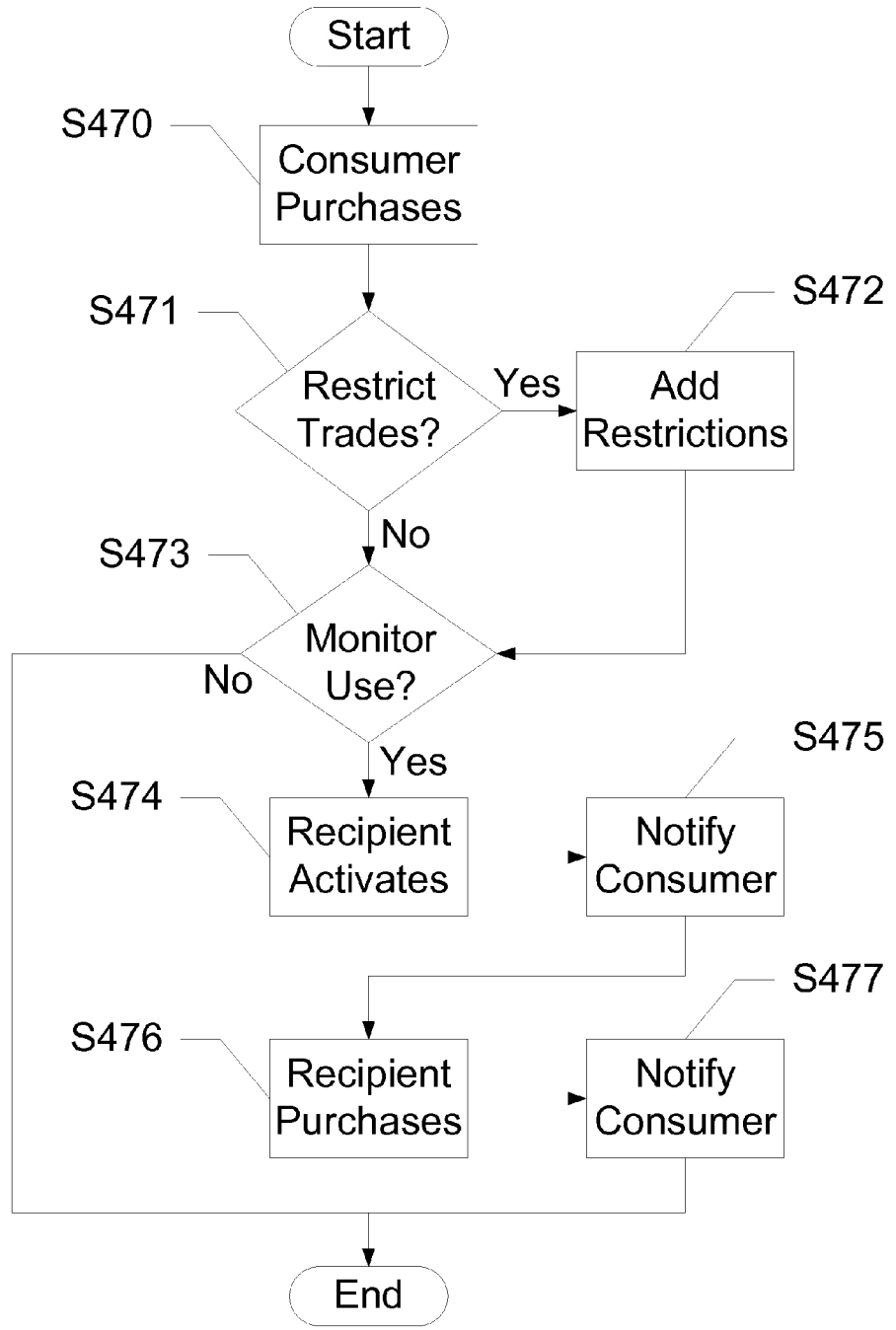
FIG. 4 shows a method of the present invention utilized by a consumer, according to an exemplary embodiment of the present invention.

FIG. 4 shows a method of the present invention utilized by a consumer, according to an exemplary embodiment of the present invention. In this embodiment, the consumer purchases a variable gift card S470 for a recipient. A gift card server offers the consumer to restrict trading of merchants S471 on the variable gift card. The consumer may add restrictions S472 to the trading of the variable gift card, such as prohibiting certain merchants or constraining the variable gift card to a certain genre of merchants. Once restrictions, if elected, have been chosen the gift card server then offers to send notifications to the consumer S473 when the recipient uses the variable gift card. If the consumer desires notifications, then the gift card server monitors use of the variable gift card. When the recipient activates the gift card S474, the gift card server notifies the consumer S475. When the recipient makes a purchase using the variable gift card S476, the gift card server notifies the consumer as well S477.

Another embodiment of the present invention allows for a time period on a card sent to a recipient. For instance, if after 90 or 180 days the card has not been even activated, there could be a mechanism for at least a portion if not all of the funds to be refunded back to the consumer. Such a feature would have to be disclosed in the terms and conditions for the consumer and the receiver so it is clear as to how the feature works. Embodiments also allow for the ability, through the two-way communication, for reminders to be sent to both parties. For instance, if the recipient has not activated the card within a given period of time, the service provider can notify the consumer and/or the recipient. Presumably, when only the consumer is notified, if the recipient is a personal friend or relation, the consumer could ask why the recipient is not using the gift card.

Figure 5:
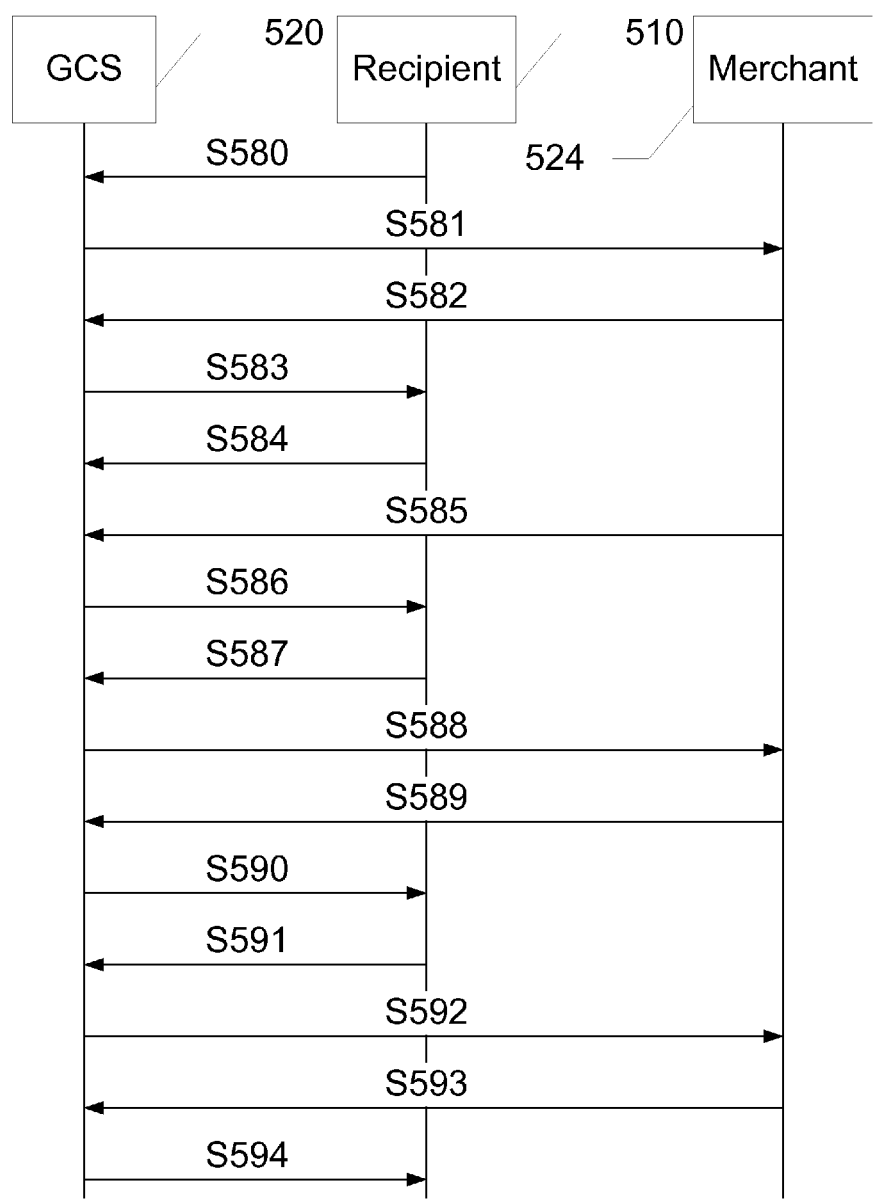
FIG. 5 shows an action diagram of a method of the present invention, according to an exemplary embodiment of the present invention.

FIG. 5 shows an action diagram of a method of the present invention, according to an exemplary embodiment of the present invention. In this embodiment, the transactions between a gift card server (GCS) 520, a recipient mobile device 510 in communication with gift card server 520, and a predefined merchant 524 in communication with the gift card server are shown.

In this embodiment, recipient mobile device 510 receives a variable gift card for predefined merchant 524. Recipient mobile device 510 sends a request to gift card server 520 to switch S580 predefined merchant 524 to another merchant. Gift card server 520 sends notification of this switch request S581 to predetermined merchant 524. Predetermined merchant 524 then makes a variable offer S582 to be sent to recipient, which the predetermined merchant 524 sends through gift card server 520. Gift card server 520 forwards the offer S583 to recipient mobile device 510. Recipient mobile device 510 selects the variable offer S584 instead of switching merchants and sends gift card server 520 the selection. Predetermined merchant 524 then offers to convert the variable gift card to a reloadable gift card S585. Gift card server 520 forwards this offer S586 to recipient mobile device 510. Recipient mobile device 510 accepts the offer S587 through gift card server 520. Gift card server 520 sends notification S588 to predetermined merchant 524, which then sends an instruction to convert the variable gift card to a reloadable gift card S589 to gift card server 520. Gift card server 520 forwards this confirmation S590 to recipient mobile device 510. Recipient mobile device 510 elects to add funds S591 to the reloadable gift card S591 through gift card server 520. Gift card server 520 then transfers funds S592 to predetermined merchant 524 in an amount that recipient mobile device 510 desires to add. Predetermined merchant 524 then sends confirmation S593 to gift card server 520, which forwards this confirmation S594 to recipient mobile device 510.

The mobile interface of exemplary embodiments of the present invention is a great tool for allowing for the creation of reloadable gift cards. Reloadable gift cards are beneficial for a merchant because there is essentially zero cost of processing those transactions, whereas a traditional VISA or MASTERCARD costs the merchant money to process. Thus, merchants are motivated to take a one time non-reloadable gift card user and convert them to a reloadable gift card user. According to the present invention, the service provider proactively prompts these non-reloadable gift card receivers at any point in time and asks them if they would like to make the gift card reloadable. This prompt may be sent through interactive interfaces and include a means for entering the data that they would need to upgrade that account. Once an account is upgradable in that regard, the original consumer could also send additional funds to top up the now reloadable account. For instance, if a recipient's boss likes to give the recipient a STARBUCKS card every quarter as a gift, every time the boss does it he has to give the recipient a different gift card. If the recipient has not used up the value on the first or the previous gift cards, the recipient is stuck with the burden of having to carry multiple cards around. With embodiments of the present invention, with the gift card being reloadable, if the boss wants to send a gift card, the provider knows that the giver has sent a gift card previously to this recipient, knows the recipient had upgraded it to a reloadable card, and gives the gift giver the option of adding value to an existing account instead of issuing another. This embodiment is a convenience for the recipient and there may be a cost savings involved because the provider does not have to reissue a new payment product, rather just adding funds to an existing one.

In a further embodiment of the present invention, a user has a designated gift card that is merchant independent such that this one card has gift cards from various stores. This allows a recipient to carry one card that contains different amounts for each of the stores.

In embodiments of the present invention, if the recipient, for example, received a BASS PRO gift card, the provider may provide the recipient the option to redirect those funds to any merchant or the service provider could put the funds in an open loop card, like a VISA gift card that can be used anywhere for any type of expenditure. This may be an extension of the redirection from a filing perspective or a technical perspective with nothing really different about how a recipient accomplishes this. The intention of the consumer may determine whether this is an option. For example, with a child going to college, a parent may want to send the child some funds for food and sends a $100 McDONALDs ARCH card. The present invention provides the ability to prevent the child from switching those funds to a VISA card, which would enable the child to go into the 7-ELEVEN and buy beer. These and other terms and conditions and business rules could be applied to the underlying infrastructure. These rules may be accessed, for instance, online to control how the gift is provided, what it can be used for, and how it can be transferred between different accounts.

Embodiments of the present invention give the consumer the option to place conditions on the gift card. For instance, the consumer may have the option to lock in a certain type of merchant. Certain conditions may not allow the recipient to redirect the gift card or may allow the recipient to redirect except for merchants in certain categories. For example, these categories may be merchants that sell tobacco or alcohol. This gives the consumer features similar to parental controls.

Figure 6:
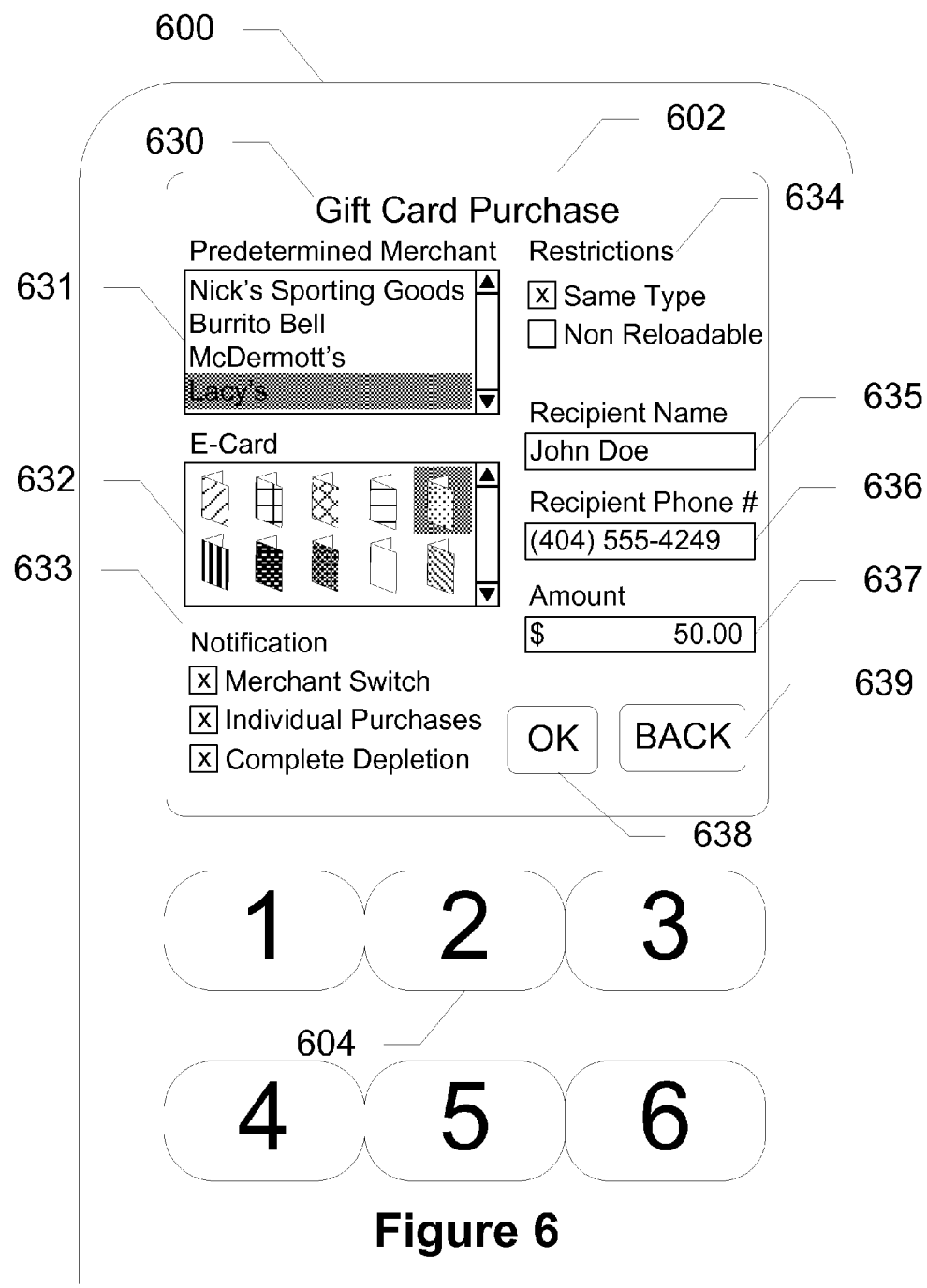
FIG. 6 shows an exemplary screenshot of a menu for purchasing a variable gift card on a consumer mobile device, according to an exemplary embodiment of the present invention.

FIG. 6 shows an exemplary screenshot of a menu for purchasing a variable gift card ("variable gift card menu") 630 on a consumer mobile device 600, according to an exemplary embodiment of the present invention. In this embodiment, the variable gift card menu 630 includes a merchant selection 631, restriction settings 634, an included E-card 632, a recipient name 635, a recipient telephone number 636, a variable gift card amount 637, notification settings 633, and confirmation 638 and cancellation 639 buttons. Variable gift card menu 630 is shown on display 602 of consumer mobile device 600. A number of merchants is listed in merchant selection 631 where a consumer can scroll to highlight one merchant to be selected. The initially selected merchant is the predetermined merchant in many exemplary embodiments of the present invention. Restriction settings 634 for restricting to a type of merchant or type of variable gift card are offered on the variable gift card menu 630. An E-card 632 is included in this embodiment, and the consumer can browse through a number of E-cards 632. A consumer may also select from notification settings 633 in order to be informed once a recipient uses the variable gift card. The consumer specifies the recipient name 635 and telephone number 636 to ensure the gift card server sends the variable gift card to the correct mobile device. Confirmation button 638 confirms the purchase of the variable gift card. Cancellation button 639 cancels the purchase and returns the consumer to the previous screen on consumer mobile device 600.

Embodiments of the present invention allow for the purchase of gift cards on a mobile device. In this embodiment, selections are made from the screen of the mobile device. The consumer may be prompted with an option to buy a gift card. If the consumer selects to buy a gift card, the user is faced with a drop down menu with participating merchants. For instance, the user may select to purchase a gift card from BASS PRO SHOPS by scrolling down to BASS PRO SHOPS on the menu and selecting this merchant. The user is then presented with another drop down menu for an amount of the gift card. Alternatively, there may be a blank space where the consumer can type this. With the merchant and amount selected, the consumer selects a payment method and checks out. During this checkout process, the consumer selects the recipient of the gift card. This may be a contact in the address book of the mobile device. Essentially, the consumer sends the provider the cellular telephone number, email address, etc., of the recipient. The consumer may be taken to a further interface which allows the consumer to choose a greeting card for the gift card. This mobile greeting card may be as simple as an SMS but could also be a multimedia message with embedded video, email, etc. The consumer or the service provider sends the mobile greeting card with the gift card. The recipient gets notice of the mobile greeting card on their mobile device, which allows them to view the greeting and the gift card. When the recipient accesses the gift card, the recipient makes a decision whether or not to keep the merchant selected by the consumer or choose a new merchant.

Figure 7:
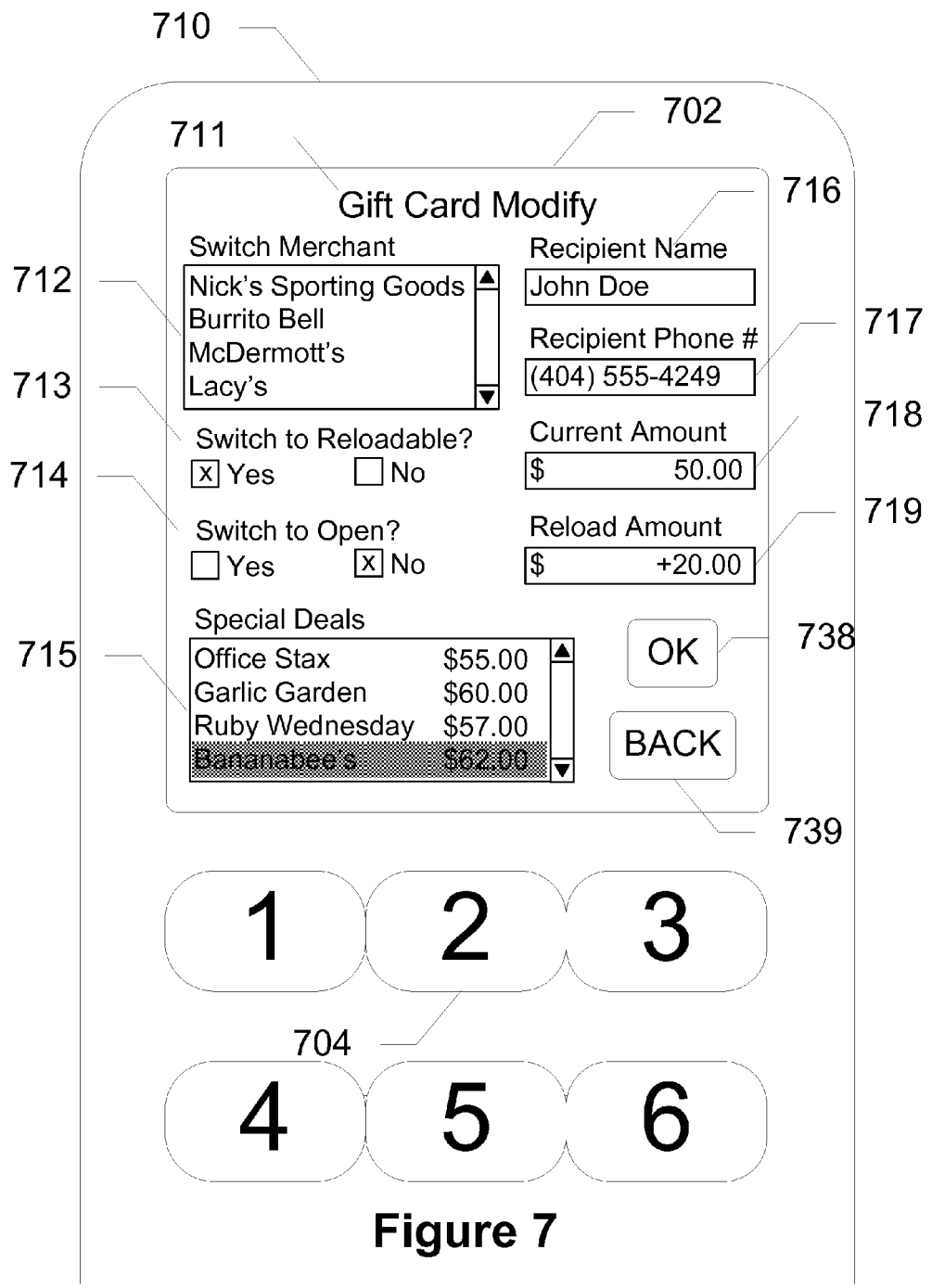
FIG. 7 shows a screenshot of a menu for modifying a variable gift card on a recipient mobile device, according to an exemplary embodiment of the present invention.

FIG. 7 shows a screenshot of a menu 711 for modifying a variable gift card on a recipient mobile device 710, according to an exemplary embodiment of the present invention. In this embodiment, menu 711 includes a list of merchants 712, a recipient name 716, a recipient telephone number 717, an option 713 to switch to a reloadable gift card, an option 714 to switch to an open gift card, a current balance 718 of the variable gift card, an amount 719 to reload to the variable gift card, variable offers 715 by merchants 712, and confirmation 738 and cancellation 739 buttons. Variable gift card modification menu 711 is shown on display 702 of recipient mobile device 710. The recipient may choose from a number of merchants 712 to which the current balance 718 of the variable gift card is to be switched. The recipient may also choose the option 713 to switch to a reloadable gift card, select the option 714 to switch to an open gift card, or select from a number of variable offers 715. The recipient is shown the current balance 718 on the variable gift card, and may enter an amount 719 to add to the variable gift card, provided the recipient selects the option 713 to convert to a reloadable gift card. Confirmation button 738 confirms the modifications of the variable gift card. Cancellation button 739 cancels the modification and returns the recipient to the previous screen on recipient mobile device 710.

Another embodiment of the present invention provides a variable value model. In many cases, merchants like gift cards not just because they are a lower cost transaction for them and they have a potential opportunity to earn interest, but a lot of studies have shown that people that walk into their stores with gift cards generally spend well beyond the face value of that card. For instance, a customer walks in with a $25 gift certificate to BEST BUY and walks out buying $179 DVD player. Thus, there is additional business value for the merchant to entice customers to take their gift card versus their competitors or someone else in another industry. With respect to the present invention, a recipient may be given a $50 gift card to, for instance, BASS PRO SHOPS. When the recipient is looking to switch to another merchant, BORDERS might be willing to give that recipient $60 of value for that $50 funding option. BORDERS looks at this extra value as a marketing expenditure. The recipient may be able to shop for various deals by the merchants on the internet, over the phone, etc. This may be particularly of interest to restaurants as they run a high margin business. The present invention may facilitate such a marketplace that allows the merchants essentially to bid for that gift card issuance. The bidding may also be static, where the merchants pre-define their specific exchange rate, or may be dynamic, allowing for real time bidding by the merchants based on a number of inputs including additional customer data that could be shared (such as demographic info, income level, past buying behavior, etc.) or other current bids that the consumer is receiving. The beneficiaries of such an arrangement are the merchants, those ones that give the best deal are likely going to get the funding, and the recipient gets more value than they would have gotten otherwise.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

I claim:

1. A method comprising:
   receiving, by a gift card server comprising a processor, an activation request for a variable gift card that is associated with a first merchant and has a value comprising a first amount that is held in an escrow account of a service provider, wherein the first merchant is not paid prior to the activation request and the service provider is different from the first merchant and a second merchant, wherein the variable gift card is associated with a restriction placed by a purchaser of the variable gift card, wherein the restriction comprises a type of merchant and prohibits certain merchants, and wherein the activation request is received from a mobile device associated with a recipient of the variable gift card;
   causing, by the gift card server, placement of the variable gift card in a mobile wallet associated with the recipient;
   receiving, by the gift card server, a bid from the second merchant, the bid specifying the second amount, wherein the second amount is greater than the first amount and is offered with an identification of the second merchant;
   receiving, by the gift card server, an acceptance of the bid, the acceptance of the bid being subject to the restriction;
   querying, by the gift card server and via a user interface associated with the mobile device, the recipient to determine if the variable gift card should be switched from being associated with the first merchant and having the value comprising the first amount to being associated with the second merchant and having the value comprising a second amount that is different from the first amount;
   receiving, by the gift card server and from the mobile device, an indication that the variable gift card should be switched to being associated with the second merchant and having the value comprising the second amount;
   associating, by the gift card server, the variable gift card with the second merchant;
   defining, by the gift card server, the value of the variable gift card as the second amount;
   transferring, by the gift card server, the first amount from the escrow account to the second merchant;
   activating, by the gift card server, the variable gift card;
   receiving, by the gift card server and from the second merchant, an activation confirmation for the variable gift card;
   forwarding, by the gift card server, the activation confirmation to the mobile device; and
   causing, by the gift card server, placement of the variable gift card for the second merchant in the mobile wallet.

2. The method of claim 1, wherein the mobile device presents the user interface during the querying, wherein the user interface comprises representations of a plurality of merchants, and wherein the first merchant is selected from the plurality of merchants, and wherein the second merchant is selected from the plurality of merchants.

3. The method of claim 1, wherein the restriction is defined by the purchaser of the variable gift card and applied when transmitting the variable gift card to the mobile device.

4. The method of claim 1, further comprising converting the variable gift card to a reloadable gift card.

5. The method of claim 1, further comprising converting the variable gift card to an open-loop gift card.

6. A system comprising:
   a gift card server comprising a processor; and
   a non-transitory computer-readable medium that stores instructions that, when executed by the processor, causes the processor to perform operations comprising
   receiving an activation request for a variable gift card that is associated with a first merchant and has a value comprising a first amount that is held in an escrow account of a service provider, wherein the first merchant is not paid prior to the activation request and the service provider is different from the first merchant and a second merchant, wherein the variable gift card is associated with a restriction placed by a purchaser of the variable gift card, wherein the restriction comprises a type of merchant and prohibits certain merchants, and wherein the activation request is received from a mobile device associated with a recipient of the variable gift card,
   causing, by the gift card server, placement of the variable gift card in a mobile wallet associated with the recipient,
   receiving, by the gift card server, a bid from the second merchant, the bid specifying the second amount, wherein the second amount is greater than the first amount and is offered with an identification of the second merchant,
   receiving, by the gift card server, an acceptance of the bid, the acceptance of the bid being subject to the restriction,
   querying, via a user interface associated with the mobile device, the recipient to determine if the variable gift card should be switched from being associated with the first merchant and having the value comprising the first amount to being associated with the second merchant and having the value comprising a second amount that is different from the first amount,
   receiving, from the mobile device, an indication that the variable gift card should be switched to being associated with the second merchant and having the value comprising the second amount,
   associating the variable gift card with the second merchant,
   defining the value of the variable gift card as the second amount,
   transferring the first amount from the escrow account to the second merchant,
   activating the variable gift card,
   receiving, from the second merchant, an activation confirmation for the variable gift card,
   forwarding the activation confirmation to the mobile device, and
   causing, by the gift card server, placement of the variable gift card for the second merchant in the mobile wallet.

7. The system of claim 6, wherein the restriction is placed when the variable gift card is transmitted to the mobile device.

8. A non-transitory computer readable medium having stored thereon executable instructions that, when executed by a processor of a gift card server, cause the gift card server to perform operations comprising:

receiving an activation request for a variable gift card that is associated with a first merchant and has a value comprising a first amount that is held in an escrow account of a service provider, wherein the first merchant is not paid prior to the activation request and the service provider is different from the first merchant and a second merchant, wherein the variable gift card is associated with a restriction placed by a purchaser of the variable gift card, wherein the restriction comprises a type of merchant and prohibits certain merchants, and wherein the activation request is received from a mobile device associated with a recipient of the variable gift card;

causing, by the gift card server, placement of the variable gift card in a mobile wallet associated with the recipient;

receiving, by the gift card server, a bid from the second merchant, the bid specifying a second amount, wherein the second amount is greater than the first amount and is offered with an identification of the second merchant;

receiving, by the gift card server, an acceptance of the bid, the acceptance of the bid being subject to the restriction;

querying, via a user interface associated with the mobile device, the recipient to determine if the variable gift card should be switched from being associated with the first merchant and having the value comprising the first amount to being associated with the second merchant and having the value comprising a second amount that is different from the first amount;

receiving, from the mobile device, an indication that the variable gift card should be switched to being associated with the second merchant and having the value comprising the second amount;

associating the variable gift card with the second merchant;

defining the value of the variable gift card as the second amount;

transferring the first amount from the escrow account to the second merchant;

activating the variable gift card;

receiving, from the second merchant, an activation confirmation for the variable gift card;

forwarding the activation confirmation to the mobile device; and causing, by the gift card server, placement of the variable gift card for the second merchant in the mobile wallet.

9. The non-transitory computer readable medium of claim 8, wherein the executable instructions, when executed by the processor of the gift card server, cause the gift card server to perform operations further comprising:

detecting a use of the variable gift card; and alerting the purchaser of the use of the variable gift card in response to detecting the use of the variable gift card.

10. The non-transitory computer readable medium of claim 8, wherein the mobile device presents the user interface during the querying, wherein the user interface comprises representations of a plurality of merchants, and wherein the first merchant is selected from the plurality of merchants.

11. The non-transitory computer readable medium of claim 8, wherein the restriction is placed when transmitting the variable gift card to the mobile device.

12. The non-transitory computer readable medium of claim 8, wherein the executable instructions, when executed by the processor of the gift card server, cause the gift card server to perform operations further comprising storing the restriction on a variable gift card database.

13. The non-transitory computer readable medium of claim 8, wherein the executable instructions, when executed by the processor of the gift card server, cause the gift card server to perform operations further comprising converting the variable gift card to a reloadable gift card.

14. The non-transitory computer readable medium of claim 8, wherein the executable instructions, when executed by the processor of the gift card server, cause the gift card server to perform operations further comprising converting the variable gift card to an open-loop gift card.

* * * * *